United States Patent
Koike et al.

(10) Patent No.: US 10,054,816 B2
(45) Date of Patent: Aug. 21, 2018

(54) METHOD FOR IMPROVING VISIBILITY OF LIQUID CRYSTAL DISPLAY DEVICE, AND LIQUID CRYSTAL DISPLAY DEVICE USING SAME

(75) Inventors: Yasuhiro Koike, Yokohama (JP); Akihiro Tagaya, Yokohama (JP)

(73) Assignees: TOYO BOSEKI KABUSHIKI KAISHA, Osaka-shi, Osaka (JP); KEIO UNIVERSITY, Tokyo (JP)

(*) Notice: Subject to any disclaimer, the term of this patent is extended or adjusted under 35 U.S.C. 154(b) by 0 days.

(21) Appl. No.: 13/509,211

(22) PCT Filed: May 11, 2010

(86) PCT No.: PCT/JP2010/057956
§ 371 (c)(1),
(2), (4) Date: May 10, 2012

(87) PCT Pub. No.: WO2011/058774
PCT Pub. Date: May 19, 2011

(65) Prior Publication Data
US 2012/0229732 A1 Sep. 13, 2012

(30) Foreign Application Priority Data
Nov. 12, 2009 (JP) .................................. 2009-259054

(51) Int. Cl.
*G02F 1/1335* (2006.01)
*G02F 1/13363* (2006.01)
*G02B 5/30* (2006.01)

(52) U.S. Cl.
CPC ..... *G02F 1/133528* (2013.01); *G02B 5/3083* (2013.01); *G02F 1/13363* (2013.01); *G02F 1/133603* (2013.01); *G02F 2202/40* (2013.01)

(58) Field of Classification Search
CPC ............. G02F 1/13363; G02F 2202/40; G02F 1/133528; G02F 2201/50; G02F 1/133611;
(Continued)

(56) References Cited

U.S. PATENT DOCUMENTS

| 4,072,779 A | | 2/1978 | Knox et al. |
| 4,586,790 A | | 5/1986 | Umeda et al. |
| 4,592,623 A | | 6/1986 | Yamamoto et al. |
| 4,799,772 A | | 1/1989 | Utsumi |
| 5,145,746 A | | 9/1992 | Tomoyuki |
| 5,231,145 A | | 7/1993 | Brueckmann et al. |
| 5,677,024 A | * | 10/1997 | Abe et al. .................. 428/40.1 |
| 5,757,447 A | | 5/1998 | Kobayashi et al. |
| 5,998,925 A | * | 12/1999 | Shimizu et al. .............. 313/503 |

(Continued)

FOREIGN PATENT DOCUMENTS

| CN | 1320219 A | 10/2001 |
| CN | 1331272 A | 1/2002 |

(Continued)

OTHER PUBLICATIONS

Japanese Patent Office, Notice of Reasons for Rejection in Japanese Patent Application No. 2011-160702 (dated Apr. 2, 2013).

(Continued)

*Primary Examiner* — Jia Pan
(74) *Attorney, Agent, or Firm* — Leydig, Voit & Mayer, Ltd.

(57) ABSTRACT

The present invention provides a liquid crystal display method capable of, when a screen thereof is observed through a polarizer such as sunglasses, ensuring an excellent visibility regardless of the angle of observation. In a liquid crystal display device at least having a backlight light source, a liquid crystal cell, and a polarizer disposed on a viewing side of the liquid crystal cell, a white light-emitting diode is used as the backlight light source; and a polymer film having a retardation of from 3,000 nm to 30,000 nm is used so as to be disposed on the viewing side of the polarizer so that an angle between an absorption axis of the polarizer and a slow axis of the polymer film becomes about 45 degrees.

4 Claims, 4 Drawing Sheets

(58) Field of Classification Search
CPC ..... G02F 1/13362; G02F 2001/133638; G02B 5/3083; G02B 5/3033; G02B 1/111; G02B 5/3025; G02B 27/26; Y10T 428/1041
USPC .................................................. 349/117, 181
See application file for complete search history.

(56) References Cited

U.S. PATENT DOCUMENTS

| | | | |
|---|---|---|---|
| 6,025,433 A | 2/2000 | Shibatoh et al. | |
| 6,055,096 A | 4/2000 | Michihata et al. | |
| 6,069,440 A | 5/2000 | Shimizu et al. | |
| 6,104,484 A * | 8/2000 | Nagata et al. | 356/246 |
| 6,280,890 B1 | 8/2001 | Sawamura et al. | |
| 6,521,700 B1 | 2/2003 | Dworak et al. | |
| 6,608,332 B2 | 8/2003 | Shimizu et al. | |
| 6,614,179 B1 | 9/2003 | Shimizu et al. | |
| 6,839,171 B2 | 1/2005 | Mizutani et al. | |
| 7,026,756 B2 | 4/2006 | Shimizu et al. | |
| 7,071,616 B2 | 7/2006 | Shimizu et al. | |
| 7,126,274 B2 | 10/2006 | Shimizu et al. | |
| 7,128,952 B2 | 10/2006 | Murakami et al. | |
| 7,215,074 B2 | 5/2007 | Shimizu et al. | |
| 7,329,988 B2 | 2/2008 | Shimizu et al. | |
| 7,362,048 B2 | 4/2008 | Shimizu et al. | |
| 7,531,960 B2 | 5/2009 | Shimizu et al. | |
| 7,569,269 B2 | 8/2009 | Takada et al. | |
| 7,633,583 B2 | 12/2009 | Wang et al. | |
| 7,682,848 B2 | 3/2010 | Shimizu et al. | |
| 7,781,068 B2 | 8/2010 | Nakamura et al. | |
| 7,855,092 B2 | 12/2010 | Shimizu et al. | |
| 7,887,718 B2 * | 2/2011 | Nagatomi et al. | 252/301.4 F |
| 7,901,959 B2 | 3/2011 | Shimizu et al. | |
| 7,911,553 B2 | 3/2011 | Tanaka | |
| 7,915,631 B2 | 3/2011 | Shimizu et al. | |
| 7,943,941 B2 | 5/2011 | Shimizu et al. | |
| 7,968,019 B2 | 6/2011 | Murakami | |
| 7,968,866 B2 | 6/2011 | Shimizu et al. | |
| 7,969,090 B2 | 6/2011 | Shimizu et al. | |
| 8,139,042 B2 | 3/2012 | Iijima | |
| 8,148,177 B2 | 4/2012 | Shimizu et al. | |
| 8,274,631 B2 | 9/2012 | Wang et al. | |
| 8,687,152 B2 | 4/2014 | Izaki et al. | |
| 8,760,601 B2 | 6/2014 | Izaki et al. | |
| 2001/0001207 A1 | 5/2001 | Shimizu et al. | |
| 2002/0061959 A1 | 5/2002 | Kajimaru et al. | |
| 2003/0156235 A1 | 8/2003 | Kuzuhara et al. | |
| 2004/0000868 A1 | 1/2004 | Shimizu et al. | |
| 2004/0004437 A1 | 1/2004 | Shimizu et al. | |
| 2004/0090180 A1 | 5/2004 | Shimizu et al. | |
| 2004/0109302 A1 * | 6/2004 | Yoneda et al. | 362/2 |
| 2004/0137265 A1 * | 7/2004 | Shimada et al. | 428/690 |
| 2004/0222435 A1 | 11/2004 | Shimizu et al. | |
| 2004/0265539 A1 | 12/2004 | Hashimoto et al. | |
| 2005/0030456 A1 | 2/2005 | Murakami et al. | |
| 2005/0100723 A1 | 5/2005 | Tanaka et al. | |
| 2005/0106334 A1 | 5/2005 | Kubo et al. | |
| 2005/0134774 A1 * | 6/2005 | Coates et al. | 349/117 |
| 2005/0168816 A1 | 8/2005 | Fukaishi et al. | |
| 2005/0247223 A1 | 11/2005 | Sampei | |
| 2005/0275779 A1 | 12/2005 | Nanno | |
| 2005/0280357 A1 | 12/2005 | Shimizu et al. | |
| 2006/0066946 A1 | 3/2006 | Liu et al. | |
| 2006/0216437 A1 | 9/2006 | Murakami | |
| 2006/0227439 A1 | 10/2006 | Taki et al. | |
| 2006/0275559 A1 | 12/2006 | Ishibashi et al. | |
| 2007/0008451 A1 | 1/2007 | Tanaka | |
| 2007/0009676 A1 | 1/2007 | Tamagawa et al. | |
| 2007/0046864 A1 | 3/2007 | Maruyama et al. | |
| 2007/0046865 A1 | 3/2007 | Umeda et al. | |
| 2007/0048460 A1 | 3/2007 | Ikeda | |
| 2007/0054066 A1 | 3/2007 | Usukura et al. | |
| 2007/0058149 A1 | 3/2007 | Oshida et al. | |
| 2007/0114914 A1 | 5/2007 | Shimizu et al. | |
| 2007/0159060 A1 | 7/2007 | Shimizu et al. | |
| 2007/0178297 A1 | 8/2007 | Takada et al. | |
| 2007/0202272 A1 | 8/2007 | Yamamoto et al. | |
| 2007/0224415 A1 * | 9/2007 | Satake | B32B 7/12 428/341 |
| 2007/0238049 A1 | 10/2007 | Ezure | |
| 2007/0242199 A1 | 10/2007 | Harada | |
| 2007/0264447 A1 | 11/2007 | Oya et al. | |
| 2007/0285776 A1 | 12/2007 | Nakamura et al. | |
| 2008/0049324 A1 | 2/2008 | Murakami et al. | |
| 2008/0050583 A1 | 2/2008 | Kubo | |
| 2008/0138527 A1 | 6/2008 | Okuma et al. | |
| 2008/0138918 A1 | 6/2008 | Shimizu et al. | |
| 2008/0218666 A1 * | 9/2008 | Toyooka | G02F 1/133528 349/96 |
| 2008/0233312 A1 | 9/2008 | Nakamura et al. | |
| 2008/0266500 A1 | 10/2008 | Nimura | |
| 2008/0303995 A1 * | 12/2008 | Shimodaira | G02F 1/133504 349/117 |
| 2009/0027599 A1 | 1/2009 | Ohgaru et al. | |
| 2009/0059134 A1 | 3/2009 | Ishikawa et al. | |
| 2009/0104413 A1 * | 4/2009 | Ahn et al. | 428/195.1 |
| 2009/0139564 A1 | 6/2009 | Miyaji et al. | |
| 2009/0153965 A1 | 6/2009 | Ito et al. | |
| 2009/0244474 A1 | 10/2009 | Fuchida et al. | |
| 2009/0251643 A1 | 10/2009 | Yamada et al. | |
| 2009/0280310 A1 | 11/2009 | Nitta et al. | |
| 2009/0303481 A1 * | 12/2009 | Nakai | G02B 5/3083 356/370 |
| 2009/0315014 A1 | 12/2009 | Shimizu et al. | |
| 2009/0315015 A1 | 12/2009 | Shimizu et al. | |
| 2009/0316068 A1 | 12/2009 | Shimizu et al. | |
| 2010/0001258 A1 | 1/2010 | Shimizu et al. | |
| 2010/0006819 A1 | 1/2010 | Shimizu et al. | |
| 2010/0019224 A1 | 1/2010 | Shimizu et al. | |
| 2010/0019270 A1 | 1/2010 | Shimizu et al. | |
| 2010/0053511 A1 | 3/2010 | Ohmuro et al. | |
| 2010/0073313 A1 | 3/2010 | Iijima | |
| 2010/0098939 A1 | 4/2010 | Tada et al. | |
| 2010/0117516 A1 | 5/2010 | Shimizu et al. | |
| 2010/0177397 A1 | 7/2010 | Kamiyama et al. | |
| 2010/0220266 A1 | 9/2010 | Kashima et al. | |
| 2010/0233389 A1 | 9/2010 | Suzuki et al. | |
| 2010/0264841 A1 | 10/2010 | Shimizu et al. | |
| 2010/0264842 A1 | 10/2010 | Shimizu et al. | |
| 2010/0296027 A1 | 11/2010 | Matsuhira et al. | |
| 2011/0019275 A1 * | 1/2011 | Suzuki | 359/485 |
| 2011/0053299 A1 | 3/2011 | Shimieu et al. | |
| 2011/0062864 A1 | 3/2011 | Shimizu et al. | |
| 2011/0085106 A1 | 4/2011 | Obata et al. | |
| 2011/0128477 A1 | 6/2011 | Izaki et al. | |
| 2011/0177314 A1 | 7/2011 | Tatami et al. | |
| 2011/0194048 A1 | 8/2011 | Izaki et al. | |
| 2011/0199561 A1 | 8/2011 | Hasegawa et al. | |
| 2011/0297990 A1 | 12/2011 | Shimizu et al. | |
| 2012/0015169 A1 | 1/2012 | Ohta | |
| 2012/0057230 A1 | 3/2012 | Murakami et al. | |
| 2012/0113356 A1 | 5/2012 | Yu et al. | |
| 2012/0113671 A1 | 5/2012 | Sadasivan et al. | |
| 2012/0121824 A1 | 5/2012 | Toyama et al. | |
| 2012/0189831 A1 | 7/2012 | Kawasaki et al. | |
| 2012/0229732 A1 | 9/2012 | Koike et al. | |
| 2012/0250142 A1 | 10/2012 | Kobuchi et al. | |
| 2013/0039031 A1 | 2/2013 | Asano et al. | |
| 2013/0100378 A1 | 4/2013 | Murata et al. | |
| 2013/0194211 A1 | 8/2013 | Shinohara et al. | |
| 2013/0272020 A1 | 10/2013 | Koide et al. | |
| 2013/0301130 A1 | 11/2013 | Nakamura et al. | |
| 2014/0028625 A1 | 1/2014 | Maeda et al. | |
| 2014/0104519 A1 | 4/2014 | Murata et al. | |
| 2014/0232951 A1 | 8/2014 | Ueda et al. | |
| 2015/0131038 A1 | 5/2015 | Ishiguro et al. | |
| 2015/0131043 A1 | 5/2015 | Yamamoto et al. | |
| 2015/0168779 A1 | 6/2015 | Kim et al. | |
| 2015/0316696 A1 | 11/2015 | Kamijo et al. | |
| 2015/0331282 A1 | 11/2015 | Yamada et al. | |
| 2016/0011355 A1 | 1/2016 | Kokudo et al. | |

(56) References Cited

U.S. PATENT DOCUMENTS

2016/0048057 A1 2/2016 Sekiguchi et al.
2016/0209564 A1 7/2016 Kuroda

FOREIGN PATENT DOCUMENTS

| | | |
|---|---|---|
| CN | 1495925 A | 5/2004 |
| CN | 1623107 A | 6/2005 |
| CN | 1641897 a | 7/2005 |
| CN | 1656399 A | 8/2005 |
| CN | 1839176 A | 9/2006 |
| CN | 1892360 A | 1/2007 |
| CN | 1916667 A | 2/2007 |
| CN | 1927996 A | 3/2007 |
| CN | 1957273 A | 5/2007 |
| CN | 101156092 A | 4/2008 |
| CN | 101273465 A | 9/2008 |
| CN | 101358144 A | 2/2009 |
| CN | 101661190 A | 3/2010 |
| CN | 101799564 A | 8/2010 |
| EP | 2871055 A1 | 5/2015 |
| JP | S14-018675 Y | 11/1939 |
| JP | S49-060317 A | 6/1974 |
| JP | S51-066163 U | 5/1976 |
| JP | 52-010100 A | 1/1977 |
| JP | S54-139921 A | 10/1979 |
| JP | S56-033611 A | 4/1981 |
| JP | S58-098709 A | 6/1983 |
| JP | S58-143305 A | 8/1983 |
| JP | S59-077401 A | 5/1984 |
| JP | 60-026304 A | 2/1985 |
| JP | S60-026304 A | 2/1985 |
| JP | S60-097323 A | 5/1985 |
| JP | S60-133402 U | 9/1985 |
| JP | S62-135338 A | 6/1987 |
| JP | S63-226603 A | 9/1988 |
| JP | S63-307403 A | 12/1988 |
| JP | H03-125302 U1 | 12/1991 |
| JP | H04-163138 A | 6/1992 |
| JP | 04-224811 A | 8/1992 |
| JP | 08-271733 A | 8/1992 |
| JP | H04-256903 A | 9/1992 |
| JP | H06-051117 A | 2/1994 |
| JP | 06-258634 A | 9/1994 |
| JP | 06258634 A * | 9/1994 |
| JP | H08-162070 A | 6/1996 |
| JP | 08-271734 A | 10/1996 |
| JP | 09-033722 A | 2/1997 |
| JP | H09-033920 A | 2/1997 |
| JP | H09-097017 A | 4/1997 |
| JP | 09-166711 A | 6/1997 |
| JP | H09-169950 A | 6/1997 |
| JP | 09-314782 A | 12/1997 |
| JP | 10-010522 A | 1/1998 |
| JP | H10-010558 A | 1/1998 |
| JP | 10-107325 A | 4/1998 |
| JP | H10-161108 A | 6/1998 |
| JP | 10-242513 A | 9/1998 |
| JP | H10-268270 A | 10/1998 |
| JP | 11-070629 A | 3/1999 |
| JP | 11070629 A * | 3/1999 |
| JP | 2000-082335 A | 3/2000 |
| JP | 2000-141530 A | 5/2000 |
| JP | 2000-162419 A | 6/2000 |
| JP | 2000-206333 A | 7/2000 |
| JP | 2000-206335 A | 7/2000 |
| JP | 2000-208815 A | 7/2000 |
| JP | 2000-231450 A | 8/2000 |
| JP | 2000-241625 A | 9/2000 |
| JP | 2000-296595 A | 10/2000 |
| JP | 2001-026762 A | 1/2001 |
| JP | 2001-051115 A | 2/2001 |
| JP | 2001-059907 A | 3/2001 |
| JP | 2001-116926 A | 4/2001 |
| JP | 2001-141922 A | 5/2001 |
| JP | 2001-181568 A | 7/2001 |
| JP | 2002-231032 A | 8/2001 |
| JP | 2001-272534 A | 10/2001 |
| JP | 2001-272682 A | 10/2001 |
| JP | 2001-334623 A | 12/2001 |
| JP | 2002-031905 A | 1/2002 |
| JP | 2002-071921 A | 3/2002 |
| JP | 2002-088334 A | 3/2002 |
| JP | 2002-509283 A | 3/2002 |
| JP | 2002-116320 A | 4/2002 |
| JP | 2002116877 A | 4/2002 |
| JP | 2002-198573 A | 7/2002 |
| JP | 2003-121818 A | 4/2003 |
| JP | 2003-121819 A | 4/2003 |
| JP | 2003-179259 A | 6/2003 |
| JP | 2004-009362 A | 1/2004 |
| JP | 2004-170875 A | 6/2004 |
| JP | 2004-189957 A | 7/2004 |
| JP | 2004-205773 A | 7/2004 |
| JP | 2004-214069 A | 7/2004 |
| JP | 2004-219620 A | 8/2004 |
| JP | 2004-226591 A | 8/2004 |
| JP | 2004-226734 A | 8/2004 |
| JP | 2004-237451 A | 8/2004 |
| JP | 2004-252082 A | 9/2004 |
| JP | 2004-361774 A | 12/2004 |
| JP | 2005-114990 A | 4/2005 |
| JP | 2005-148519 A | 6/2005 |
| JP | 2005-157082 A | 6/2005 |
| JP | 2005-173462 A | 6/2005 |
| JP | 2005-181450 A | 7/2005 |
| JP | 2005-265889 A | 9/2005 |
| JP | 2005-266464 A | 9/2005 |
| JP | 2005-317985 A | 11/2005 |
| JP | 2005-321543 A | 11/2005 |
| JP | 2005-352068 A | 12/2005 |
| JP | 2006-062281 A | 3/2006 |
| JP | 2006-079067 A | 3/2006 |
| JP | 2006-106427 A | 4/2006 |
| JP | 2006-215107 A | 8/2006 |
| JP | 2006-215175 A | 8/2006 |
| JP | 2006-251294 A | 9/2006 |
| JP | 2006-276574 A | 10/2006 |
| JP | 2006-276697 A | 10/2006 |
| JP | 2006-301592 A | 11/2006 |
| JP | 2007-039535 A | 2/2007 |
| JP | 2007-059360 A | 3/2007 |
| JP | 2007-080953 A | 3/2007 |
| JP | 2007-086722 A | 4/2007 |
| JP | 2007-140248 A | 6/2007 |
| JP | 2007-152932 A | 6/2007 |
| JP | 2007-171707 A | 7/2007 |
| JP | 2007-233114 A | 9/2007 |
| JP | 2007-253512 A | 10/2007 |
| JP | 2007-279243 A | 10/2007 |
| JP | 2007-279469 A | 10/2007 |
| JP | 2007-286447 A | 11/2007 |
| JP | 2007-304391 A | 11/2007 |
| JP | 2008-003425 A | 1/2008 |
| JP | 2008-030370 A | 2/2008 |
| JP | 2008-052067 A | 3/2008 |
| JP | 2008-083115 A | 4/2008 |
| JP | 2008-132768 A | 6/2008 |
| JP | 2008-155435 A | 7/2008 |
| JP | 2008-160140 A | 7/2008 |
| JP | 2008-163078 A | 7/2008 |
| JP | 2008-192620 A | 8/2008 |
| JP | 2008-208223 A | 9/2008 |
| JP | 2008-537803 A | 9/2008 |
| JP | 2008-242238 A | 10/2008 |
| JP | 2008-266392 A | 11/2008 |
| JP | 2008-281866 A | 11/2008 |
| JP | 2008-546866 A | 12/2008 |
| JP | 2009-006543 A | 1/2009 |
| JP | 2009-014886 A | 1/2009 |
| JP | 2009-102573 A | 5/2009 |
| JP | 2009-109995 A | 5/2009 |
| JP | 2009-139526 A | 6/2009 |
| JP | 2009-157347 A | 7/2009 |
| JP | 2009-157348 A | 7/2009 |

(56) References Cited

FOREIGN PATENT DOCUMENTS

| | | |
|---|---|---|
| JP | 2009-157361 A | 7/2009 |
| JP | 2009-160830 A | 7/2009 |
| JP | 2009-169389 A | 7/2009 |
| JP | 2009-175685 A | 8/2009 |
| JP | 2009-244711 A | 10/2009 |
| JP | 2009-251035 A | 10/2009 |
| JP | 2009-269174 A | 11/2009 |
| JP | 2009-269301 A | 11/2009 |
| JP | 2009-288395 A | 12/2009 |
| JP | 2009-294675 A | 12/2009 |
| JP | 2009-300955 A | 12/2009 |
| JP | 2010-026112 A | 2/2010 |
| JP | 2010-032718 A | 2/2010 |
| JP | 2010/044200 A | 2/2010 |
| JP | 2010-046816 A | 3/2010 |
| JP | 2010-054750 A | 3/2010 |
| JP | 2010-080290 A | 4/2010 |
| JP | 2010-096948 A | 4/2010 |
| JP | 2010079481 A | 4/2010 |
| JP | 2010-107892 A | 5/2010 |
| JP | 2010-113054 A | 5/2010 |
| JP | 2010139938 A | 6/2010 |
| JP | 2010-209126 A | 9/2010 |
| JP | 2010-217844 A | 9/2010 |
| JP | 2010-224345 A | 10/2010 |
| JP | 2010-243630 A | 10/2010 |
| JP | 2010-271447 A | 12/2010 |
| JP | 2010-271509 A | 12/2010 |
| JP | 2010-277028 A | 12/2010 |
| JP | 2011-005854 A | 1/2011 |
| JP | 2011-007830 A | 1/2011 |
| JP | 2011-008169 A | 1/2011 |
| JP | 2011-008170 A | 1/2011 |
| JP | 2011-013402 A | 1/2011 |
| JP | 2011-028945 A | 2/2011 |
| JP | 2011-059488 A | 3/2011 |
| JP | 2011-067952 A | 4/2011 |
| JP | 2011-081359 A | 4/2011 |
| JP | 2011-088429 A | 5/2011 |
| JP | 2011-090042 A | 5/2011 |
| JP | 2011-099089 A | 5/2011 |
| JP | 2011-107198 A | 6/2011 |
| JP | 2011-110718 A | 6/2011 |
| JP | 2011-140139 A | 7/2011 |
| JP | 2011-140140 A | 7/2011 |
| JP | 2011-181875 A | 9/2011 |
| JP | 2011-186290 A | 9/2011 |
| JP | 2011-195692 A | 10/2011 |
| JP | 2011-208147 A | 10/2011 |
| JP | 2011-215295 A | 10/2011 |
| JP | 2011-215646 A | 10/2011 |
| JP | 201142380 A | 12/2011 |
| JP | 2012-003007 A | 1/2012 |
| JP | 2012-003259 A | 1/2012 |
| JP | 2012-025027 A | 2/2012 |
| JP | 2012-025850 A | 2/2012 |
| JP | 2012-083744 A | 4/2012 |
| JP | 2012-091336 A | 5/2012 |
| JP | 2012-103470 A | 5/2012 |
| JP | 4962661 B2 | 6/2012 |
| JP | 2012-198879 A | 10/2012 |
| JP | 5051328 B1 | 10/2012 |
| JP | 2012-214026 A | 11/2012 |
| JP | 2012-215623 A | 11/2012 |
| JP | 2012-215724 A | 11/2012 |
| JP | 2012-220879 A | 11/2012 |
| JP | 2012-256014 A | 12/2012 |
| JP | 2013-029919 A | 2/2013 |
| JP | 4888853 B2 | 2/2013 |
| JP | 2013-054207 A | 3/2013 |
| JP | 2013-079993 A | 5/2013 |
| JP | 2013-539598 A | 10/2013 |
| JP | 2013-254171 A | 12/2013 |
| JP | 5370601 B1 | 12/2013 |
| JP | 2014-010315 A | 1/2014 |
| JP | 2014-010316 A | 1/2014 |
| JP | 2014-011318 A | 1/2014 |
| JP | 2014-012373 A | 1/2014 |
| JP | 2014-013367 A | 1/2014 |
| JP | 2014-015035 A | 1/2014 |
| JP | 2014-016590 A | 1/2014 |
| JP | 2014-016591 A | 1/2014 |
| JP | 2014-032275 A | 2/2014 |
| JP | 2014-044389 A | 3/2014 |
| JP | 2014-170223 A | 9/2014 |
| JP | 2014-215473 A | 11/2014 |
| JP | 2014-219438 A | 11/2014 |
| JP | 2015-055680 A | 3/2015 |
| JP | 2015-094903 A | 5/2015 |
| JP | 2015-141346 A | 8/2015 |
| JP | 2015-215577 A | 12/2015 |
| JP | 2015-224267 A | 12/2015 |
| JP | 2016-021000 A | 2/2016 |
| JP | 2016-504632 A | 2/2016 |
| KR | 2003-0060787 A | 7/2003 |
| KR | 2010-0048187 A | 5/2010 |
| KR | 2010-0078564 A | 7/2010 |
| KR | 20110014515 A | 2/2011 |
| TW | 575501 B | 2/2004 |
| TW | 200428041 A | 12/2004 |
| TW | 200704686 A | 2/2007 |
| TW | 200819871 A | 5/2008 |
| TW | 200827787 A | 7/2008 |
| TW | 200831962 A | 8/2008 |
| TW | 200931083 A | 7/2009 |
| TW | 201017236 A | 5/2010 |
| TW | 2010-22016 A | 6/2010 |
| TW | 201022794 A | 6/2010 |
| TW | 201035605 A | 10/2010 |
| TW | 201043675 A | 12/2010 |
| TW | 201128264 A | 8/2011 |
| TW | 201131218 A | 9/2011 |
| TW | 201205160 A | 2/2012 |
| TW | 201207012 A | 2/2012 |
| TW | 201300893 A | 1/2013 |
| WO | WO 1999/036814 A1 | 7/1999 |
| WO | WO 2000/007046 A1 | 2/2000 |
| WO | WO 2003/074611 A1 | 9/2003 |
| WO | WO 2005/050269 A1 | 6/2005 |
| WO | WO 2006/113164 A1 | 10/2006 |
| WO | WO 2007/001555 A1 | 1/2007 |
| WO | WO 2007/020909 A1 | 2/2007 |
| WO | WO 2007/023929 A1 | 3/2007 |
| WO | WO 2008/047785 A1 | 4/2008 |
| WO | WO 2010/050355 A1 | 5/2010 |
| WO | WO 2010/079555 A1 | 7/2010 |
| WO | WO 2010/110549 A2 | 9/2010 |
| WO | WO 2011/030757 A1 | 3/2011 |
| WO | WO 2011/058774 A1 | 5/2011 |
| WO | WO 2011/114884 A1 | 9/2011 |
| WO | WO 2011/162198 A1 | 12/2011 |
| WO | WO 2012/021643 A2 | 2/2012 |
| WO | WO 2012/033141 A1 | 3/2012 |
| WO | WO 2012/049977 A1 | 4/2012 |
| WO | WO 2012/141147 A1 | 10/2012 |
| WO | WO 2012/157662 A1 | 11/2012 |
| WO | WO 2012/157663 A1 | 11/2012 |
| WO | WO 2013/069162 A1 | 5/2013 |
| WO | WO 2013/080949 A1 | 6/2013 |
| WO | WO 2013/100042 A1 | 7/2013 |
| WO | WO 2013/187134 A1 | 12/2013 |
| WO | WO 2014/021242 A1 | 2/2014 |
| WO | WO 2014/042022 A1 | 3/2014 |
| WO | WO 2014/132726 A1 | 9/2014 |
| WO | WO 2014/203894 A1 | 12/2014 |

OTHER PUBLICATIONS

Japanese Patent Office, Notice of Observations by Third Parties in Japanese Patent Application No. 2011-160702 (dated Jul. 2, 2013).

Ishikawa, Kenji, "3D Stereoscopic Images Are Coming," Ohmsa Ltd., pp. 62-118 (Apr. 25, 2010).

(56) References Cited

OTHER PUBLICATIONS

Japanese Patent Office, International Search Report in International Patent Application No. PCT/JP2013/071201 (dated Sep. 10, 2013).
Japanese Patent Office, International Search Report in International Patent Application No. PCT/JP2013/070428 (dated Oct. 15, 2013).
Japanese Patent Office, Notice of Reasons for Rejection in Japanese Patent Application No. 2012-132122 (dated Dec. 3, 2013).
Japanese Patent Office, International Search Report in International Patent Application No. PCT/JP2011/064026 (dated Jul. 12, 2011).
Japanese Patent Office, International Search Report in International Patent Application No. PCT/JP2012/062476 (dated Jun. 26, 2012).
Japanese Patent Office, International Search Report in International Patent Application No. PCT/JP2012/062477 (dated Jul. 10, 2012).
Japanese Patent Office, International Search Report and Written Opinion in International Patent Application No. PCT/JP2012/083849 (dated Mar. 12, 2013).
Japanese Patent Office, International Search Report and Written Opinion in International Patent Application No. PCT/JP2012/083853 (dated Mar. 19, 2013).
Japanese Patent Office, International Search Report in Japanese Application No. PCT/JP2012/083848 (dated Apr. 2, 2013).
Japanese Patent Office, Office Action in Japanese Patent Application No. 2009-259054 (dated Aug. 3, 2010).
Japanese Patent Office, Office Action in Japanese Patent Application No. 2009-259054 (dated May 24, 2011).
Japanese Patent Office, Office Action in Japanese Patent Application No. 2011-160702 (dated Apr. 10, 2012).
Kobayashi et al., "A Novel High Retardation Polymer Film for Liquid Crystal Displays," FMCp-31, pp. 871-874, presented at 16$^{th}$ International Display Workshops (IDW '09), World Convention Center Summit, Miyazaki, Japan, pp. 1-209 and cover pages (Dec. 9-11, 2009).
Japanese Patent Office, International Search Report in International Patent Application No. PCT/JP2014/052850 (dated Mar. 4, 2014).
Japanese Patent Office, Notice of Reasons for Rejection in Japanese Patent Application No. 2012-132122 (dated Apr. 8, 2014).
Japanese Patent Office, International Search Report in International Patent Application No. PCT/JP2014/052849 (dated Apr. 28, 2014).
Japanese Patent Office, International Search Report in International Patent Application No. PCT/JP2014/060377 (dated Jun. 24, 2014).
Japanese Patent Office, International Search Report in International Patent Application No. PCT/JP2014/062301 (dated Jul. 8, 2014).
Kobayashi et al., 58th SPSJ Annual Meeting, *Polymer Preprints*, Japan, 58(1): 1362 (May 12, 2009).
Kobayashi et al., 58th SPSJ Symposium on Macromolecules, *Polymer Preprints*, Japan, 58(2): 4144 (Sep. 1, 2009).
Kobayashi et al., *The Fifteenth Microoptics Conference, Technical Digest*, pp. 30-31 (Oct. 25, 2009).
Japanese Patent Office, International Search Report in International Patent Application No. PCT/JP2010/057956 (dated Aug. 10, 2010).
Hirosaki et al., "White Light-emitting Diode Lamps for Lighting Applications," *Fujikura Technical Journal*, 109: 1-4 (Oct. 2005).
National Institute for Materials Science, "Success in Trial Production of White LED for Liquid Crystal Backlight—Improvement in Color Reproducibility of Liquid Crystal Display," Press Release (Mar. 19, 2008).
NEC, "LED Performance Required for Liquid Crystal Display for Industrial Use and LED B/L Technology," *NEC Technical Journal*, vol. 60, No. Mar. 2007 (Sep. 2007).
Sharp Corporation, "LED Device for Liquid Crystal TV Backlight," Sharp *Technical Journal*, 99: 20-22 (Aug. 2009).
Tanaka, Kazushi, "Current Status and Future Perspective of Liquid Crystal Related Market in 2008, vol. 2," pp. 379-382 (Fuji Chimera Research Institute, Inc., Jul. 28, 2008).
Japanese Patent Office, Submission of Information by a Third Party in Japanese Patent Application No. 2012-132122 (dated Jan. 28, 2014).
European Patent Office, Extended European Search Report in European Patent Application 12785180.6 (dated Jan. 30, 2015).
European Patent Office, Extended European Search Report in European Patent Application 14186320.9 (dated Dec. 22, 2014).
Taiwan Patent Office, Notification for the Opinions of Examination in Taiwanese Patent Application No. 101144456 (dated Mar. 20, 2015).
Japanese Patent Office, International Search Report in International Patent Application No. PCT/JP2014/062286 (dated Jul. 22, 2014).
Japanese Patent Office, Notice of Information Offer in Japanese Patent Application No. 2012-132122 (dated Jul. 15, 2014).
Japanese Patent Office, Decision of Rejection in Japanese Patent Application No. 2012-132122 (dated Jan. 13, 2015).
European Patent Office, Extended European Search Report in European Patent Application No. 12786442.9 (dated Nov. 4, 2014).
Taiwan Patent Office, Notification for the Opinion of Examination in Taiwanese Patent Application No. 102127019 (dated Apr. 10, 2015).
Wikipedia, "Backlight" (Dec. 4, 2015) [available on the internet at: https://en.wikipedia.org/wiki/Backlight].
European Patent Office, Communication Pursuant to Rule 114(2) EPC in European Patent Application No. 14186320.9 (dated Nov. 18, 2015).
Chinese Patent Office, The First Office Action in Chinese Patent Application No. 201280058791.2 (dated Dec. 3, 2015).
DIC Color Design, Inc., "XYZ Color System" (2015) [obtained at http://www.dic-color.com/knowledge/xyz.html].
Japan Industrial Standard (JIS) Z 8701, "Color Display Method by XYZ Color System and $X_{10}Y_{10}Z_{10}$ Color System," Specification of Colours According to the CIE 1931—Standard Colorimetric System and the CIE 1964—Supplementary Standard Colorimetric System, pp. 111-119 (1982).
Kato, *Jour. Geol. Soc. Japan*, 107(1): 64-67 (Jan. 2001).
Kirk-Othmer, *Concise Encyclopedia of Chemical Technology*, "Film and Sheeting Materials," p. 1159 (1988).
Ministry of Internal Affairs and Communications, *Japan Standard Industrial Classification*, "Manufacturing industries of plastic films, sheets, floor materials, and artificial leather," item 182 (revised Oct. 2013—enforced Apr. 1, 2014).
Nagatsuka et al., *Nitto Technical Journal*, 27(1): 46-53 (May 1989).
Japanese Patent Office, Notice of Dispatch for Duplicate Patent Opposition in Japanese Opposition No. 2016-700225, Dispatch No. 042937, in Japanese Patent 5789564 (dated May 13, 2016).
Japanese Patent Office, Notice of Dispatch for Duplicate Patent Opposition in Japanese Opposition No. 2016-700225, Dispatch No. 042941, in Japanese Patent 5789564 (dated May 13, 2016).
Japanese Patent Office, Notification of Reasons for Refusal (Office Action) in Japanese Patent Application No. 2012-284081 (dated Aug. 2, 2016).
Japanese Patent Office, International Search Report in International Patent Application No. PCT/JP2016/056336 (dated May 10, 2016).
Japanese Patent Office, International Search Report in International Patent Application No. PCT/JP2016/059301 (dated Jun. 14, 2016).
Japanese Patent Office, Notification of Reasons for Refusal in Japanese Patent Application No. 2012-284048 (dated Jun. 14, 2016).
Japanese Patent Office, Notification of Reasons for Refusal in Japanese Patent Application No. 2012-284049 (dated Jul. 5, 2016).
Japanese Patent Office, Notification of Reasons for Refusal in Japanese Patent Application No. 2012-174967 (dated Mar. 8, 2016).
Japanese Patent Office, Notification of Reasons for Refusal in Japanese Patent Application No. 2012-174968 (dated Mar. 8, 2016).
Japanese Patent Office, Notification of Reasons for Refusal in Japanese Patent Application No. 2012-174969 (dated Mar. 8, 2016).
Japanese Patent Office, Notification of Reasons for Refusal in Japanese Patent Application No. 2012-175930 (dated Mar. 8, 2016).
Japanese Patent Office, Notification of Reasons for Refusal in Japanese Patent Application No. 2012-198501 (dated Mar. 29, 2016).
Japanese Patent Office, Notification of Reasons for Refusal in Japanese Patent Application No. 2012-284085 (dated Sep. 6, 2016).
European Patent Office, Communication Pursuant to Article 94(3) EPC, in European Patent Application No. 11798082.1 (dated Nov. 14, 2016).

(56) References Cited

OTHER PUBLICATIONS

European Patent Office, Communication Pursuant to Article 94(3) EPC, in European Patent Application No. 14186320.9 (dated Nov. 14, 2016).
Chinese Patent Office, The Fourth Office Action in Chinese Patent Application No. 201180030818.2 (dated Nov. 2, 2016).
Japanese Patent Office, Notification of Reasons for Refusal in Japanese Patent Application No. 2013-027736 (dated Nov. 22, 2016).
Japanese Patent Office, Notification of Reasons for Refusal in Japanese Patent Application No. 2013-027743 (dated Nov. 22, 2016).
Japanese Patent Office, Notification of Reasons for Refusal in Japanese Patent Application No. 2013-027750 (dated Nov. 22, 2016).
Japanese Patent Office, Notification of Reasons for Refusal in Japanese Patent Application No. 2013-027754 (dated Nov. 22, 2016).
Japanese Patent Office, Notification of Reasons for Refusal in Japanese Patent Application No. 2013-027755 (dated Nov. 22, 2016).
Japanese Patent Office, Notification of Reasons for Refusal in Japanese Patent Application No. 2013-028290 (dated Nov. 22, 2016).
Japanese Patent Office, Notification of Reasons for Refusal in Japanese Patent Application No. 2013-027738 (dated Nov. 29, 2016).
Japanese Patent Office, Notification of Reasons for Refusal in Japanese Patent Application No. 2013-028157(dated Nov. 29, 2016).
Japanese Patent Office, Notification of Reasons for Refusal in Japanese Patent Application No. 2013-028161(dated Nov. 29, 2016).
Japanese Patent Office, Notification of Reasons for Refusal in Japanese Patent Application No. 2013-551788 (dated Dec. 6, 2016).
Japanese Patent Office, Notification of Reasons for Refusal in Japanese Patent Application No. 2013-253161 (dated Dec. 20, 2016).
Japanese Patent Office, Notification of Reasons for Refusal in Japanese Patent Application No. 2014-006636 (dated Dec. 20, 2016).
Japanese Patent Office, Notification of Reasons for Refusal in Japanese Patent Application No. 2014-017181 (dated Dec. 27, 2016).
Japanese Patent Office, Notification of Reasons for Refusal in Japanese Patent Application No. 2016-063353 (dated Dec. 27, 2016).
Japanese Patent Office, Notification of Reasons for Refusal in Japanese Patent Application No. 2013-028384 (dated Jan. 4, 2017).
Japanese Patent Office, Notification of Reasons for Refusal in Japanese Patent Application No. 2013-181235 (dated Jan. 10, 2017).
Japanese Patent Office, Notification of Reasons for Refusal in Japanese Patent Application No. 2013-253159 (dated Jan. 10, 2017).
Japanese Patent Office, Notification of Reasons for Refusal in Japanese Patent Application No. 2013-028271 (dated Dec. 20, 2016).
Japanese Patent Office, Notification of Reasons for Refusal in Japanese Patent Application No. 2013-028349 (dated Dec. 20, 2016).
Japanese Patent Office, Notification of Reasons for Refusal in Japanese Patent Application No. 2013-028365 (dated Dec. 20, 2016).
Japanese Patent Office, Notification of Reasons for Refusal in Japanese Patent Application No. 2013-028378 (dated Dec. 20, 2016).
Chinese Patent Office, Third Office Action in Chinese Patent Application No. 201280024048.5 (dated Oct. 17, 2016).
Japanese Patent Office, International Search Report in International Patent Application No. PCT/JP2016/070384 (dated Sep. 20, 2016).
Japanese Patent Office, Notification of Reasons for Refusal in Japanese Patent Application No. 2013-023667 (dated Oct. 4, 2016).
Japanese Patent Office, Notification of Reasons for Refusal in Japanese Patent Application No. 2013-027735 (dated Oct. 4, 2016).
Japanese Patent Office, Notification of Reasons for Refusal in Japanese Patent Application No. 2013-028260 (dated Oct. 4, 2016).
Japanese Patent Office, Notification of Reasons for Refusal in Japanese Patent Application No. 2013-028263 (dated Oct. 4, 2016).
Japanese Patent Office, Notice of Reasons for Revocation in Japanese Patent No. 5789564 (dated Oct. 26, 2016).
Japanese Patent Office, Notification of Reasons for Refusal in Japanese Patent Application No. 2013-027745 (dated Nov. 15, 2016).
Japanese Patent Office, Notification of Reasons for Refusal in Japanese Patent Application No. 2013-028054 (dated Nov. 15, 2016).
Japanese Patent Office, Notification of Reasons for Refusal in Japanese Patent Application No. 2013-028062 (dated Nov. 15, 2016).
Hartlove, "Quantum Dots Unleash High Color Gamut Performance in LED-Backlit Displays," *LEDs Magazine Japan*, pp. 14-16 (Dec. 2011).
Olympus Corporation, "Series II: Basis of Polarization Analysis," obtained from Olympus Corporation website (Jul. 13, 2009).
Saito, "Illustrated Basis of Optics," *Electronics Series*, First Edition, Nikkan Kogyo Shimbun Ltd. (publisher), pp. 154-157 (Nov. 25, 2011).
Ukai, "Introduction to Flat Panel Display (6) FPD to Components and Materials Technology (1) Touch Panel," *The Chemical Times*, 2011(4): 2-7 (2011).
Chinese Patent Office, The First Office Action in Chinese Patent Application No. 201480027949.9 (dated Jun. 2, 2017).
Japanese Patent Office, International Search Report in International Patent Application No. PCT/JP2017/011981 (dated Jun. 6, 2017).
Japanese Patent Office, Notice on Information Offer Form in Japanese Patent Application No. 2011-160702 (dated Jan. 29, 2013).
Japanese Patent Office, Notification of Reasons for Refusal in Japanese Patent Application No. 2012-171990 (dated Oct. 4, 2016).
Japanese Patent Office, Notification of Reasons for Refusal in Japanese Patent Application No. 2012-174966 (dated Apr. 26, 2016).
Japanese Patent Office, Notification of Reasons for Refusal in Japanese Patent Application No. 2012-174966 (dated Nov. 29, 2016).
Japanese Patent Office, Notification of Reasons for Refusal in Japanese Patent Application No. 2012-198500 (dated May 10, 2016).
Japanese Patent Office, Notification of Reasons for Refusal in Japanese Patent Application No. 2012-198500 (dated Jan. 24, 2017).
Japanese Patent Office, Notification of Reasons for Refusal in Japanese Patent Application No. 2012-284081 (dated Mar. 7, 2017).
Japanese Patent Office, Notification of Reasons for Refusal in Japanese Patent Application No. 2013-106235 (dated Dec. 20, 2016).
Japanese Patent Office, Notification of Reasons for Refusal in Japanese Patent Application No. 2013-106236 (dated Mar. 14, 2017).
Japanese Patent Office, Notification of Reasons for Refusal in Japanese Patent Application No. 2016-063352 (dated Jan. 31, 2017).
Japanese Patent Office, Notification of Reasons for Revocation in Japanese Patent Application No. 2016-700225 (dated Jun. 9, 2017).
Korean Patent Office, Notification of Reasons for Refusal in Korean Patent Application No. 10-2016-7031805 (dated Mar. 20, 2017).
Japanese Patent Office, Decision to Objection in Opposition No. 2016-700225 against Japanese Patent 5789564 B (dated Nov. 21, 2017).
Japanese Patent Office, Notification of Transmission of Duplicate of Argument in Opposition No. 2016-700225 against Japanese Patent 5789564 B (dated Nov. 21, 2017).

(56) References Cited

OTHER PUBLICATIONS

Fukuda et al., "New Green-Emitting Sialon-Based Phosphor for White LEDs," Toshiba Review, 64(4): 60-63 (2009).
Japanese Patent Office, Notification of Reasons for Refusal in Japanese Patent Application No. 2013-028259 (dated Feb. 6, 2018).
Japanese Patent Office, Notification of Reasons for Refusal in Japanese Patent Application No. 2013-028260 (dated Feb. 6, 2018).
Japanese Patent Office, Notification of Reasons for Refusal in Japanese Patent Application No. 2013-028263 (dated Feb. 6, 2018).
U.S. Appl. No. 13/806,023, filed Dec. 20, 2012.
U.S. Appl. No. 14/118,115, filed Nov. 15, 2013.
U.S. Appl. No. 14/118,169, filed Nov. 15, 2013.
U.S. Appl. No. 15/476,339, filed Mar. 31, 2017.
U.S. Appl. No. 15/861,186, filed Jan. 3, 2018.
Japanese Patent Office, Notification of Reasons for Refusal for Japanese Patent Application No. 2013-228154 (dated Mar. 27, 2018).
Japanese Patent Office, Notification of Reasons for Refusal for Japanese Patent Application No. 2017-127016 (dated Mar. 20, 2018).
Japanese Patent Office, Notification of Reasons for Refusal in Japanese Patent Application No. 2013-060416 (dated Jan. 17, 2017).
Japanese Patent Office, Notification of Reasons for Refusal in Japanese Patent Application No. 2013-103941 (dated Jan. 17, 2017).
Japanese Patent Office, Notification of Reasons for Refusal in Japanese Patent Application No. 2014-012284 (dated Jan. 17, 2017).
Japanese Patent Office, Notification of Reasons for Refusal in Japanese Patent Application No. 2013-102468 (dated Jan. 24, 2017).
Japanese Patent Office, Notification of Reasons for Refusal in Japanese Patent Application No. 2013-103844 (dated Jan. 24, 2017).
Japanese Patent Office, International Search Report in International Patent Application No. PCT/JP2016/084524 (dated Jan. 31, 2017).
Japanese Patent Office, Notification of Reasons for Refusal in Japanese Patent Application No. 2013-105035 (dated Feb. 14, 2017).

* cited by examiner

METHOD FOR IMPROVING VISIBILITY OF LIQUID CRYSTAL DISPLAY DEVICE, AND LIQUID CRYSTAL DISPLAY DEVICE USING SAME

CROSS-REFERENCE TO RELATED APPLICATIONS

This patent application is the U.S. national phase of International Patent Application No. PCT/JP2010/057956, filed May 11, 2010, which claims the benefit of Japanese Patent Application No. 2009-259054, filed Nov. 12, 2009, which are incorporated by reference in their entireties.

TECHNICAL FIELD

The present invention relates to a method of improving the visibility of a liquid crystal display device, the method capable of, when the screen of the liquid crystal display device is observed through a polarizer such as sunglasses, ensuring excellent visibility regardless of the angle of observation, and the present invention also relates to a liquid crystal display device using the same.

BACKGROUND ART

In recent years, liquid crystal display devices (LCDs) have expanded applications, and LCDs are applied even to various displays used outdoors. The applications of LCDs have been expanded, for example, to instrument panels of automobiles, ships, and airplanes; mobile devices such as automobile-mounted navigation systems, digital cameras, mobile phones, and personal computers; and digital signages used in buildings, supermarkets, and other facilities.

An LCD performs display by causing a liquid crystal panel, in which a liquid crystal cell is sandwiched between two polarizers, to transmit or block the light from outside or the light generated by a light source such as frontlight or backlight. As the backlight light source, it is ordinary to use fluorescent tubes such as cold-cathode tubes or hot-cathode tubes. The spectral distribution of fluorescent tubes such as cold-cathode tubes or hot-cathode tubes shows an emission spectrum having two or more peaks. The combination of colors in such a discontinuous emission spectrum provides a white light source. Meanwhile, the applications of light-emitting diodes, which consume low power, have been studied in view of energy conservation. In particular, white light-emitting diodes (white LEDs) have a more continuous and wider emission spectrum than that of fluorescent tubes, and also have an excellent luminous efficiency.

Incidentally, there is a case where, in an environment such as outdoors in the strong sunlight, an observer views an LCD while wearing sunglasses having polarization properties to eliminate the glare. In this case, the observer views, through polarizers, linearly polarized light emitted from the LCD. Therefore, the screen cannot be viewed depending on the angle between the absorption axis of a polarizer included in the LCD and the absorption axis of a polarizer such as sunglasses.

To solve the above problem, for example, Patent Document 1 proposes a method for performing depolarization by layering a retardation (one-quarter wavelength) film obliquely on the surface of an LCD to convert linearly polarized light into circularly polarized light.

In addition, Patent Document 2 proposes the use of a highly birefringent material, such as calcite or synthetic quartz, as a depolarizing device to solve the above problem.

This solution makes use of the following properties: If a highly birefringent material such as calcite or synthetic quartz is inserted between crossed polarizers (i.e., crossed-nicols), the light transmitted through the highly birefringent material having a great retardation (e.g., a retardation of higher than 100,000 nm) becomes light having various wavelengths. Thus, the resulting light interferes with itself due to the various wavelengths and presents white light.

PRIOR ART DOCUMENTS

Patent Document 1: Japanese Patent Laid-open Publication No. 2005-352068
Patent Document 2: Japanese Patent Laid-open Publication No. Hei 10-10522

DISCLOSURE OF THE INVENTION

Problems to be Solved by the Invention

However, even the retardation (one-quarter wavelength) film merely achieves a phase difference of one-quarter wavelength of light only in a specific wavelength region, and there cannot have been obtained a material for achieving a phase difference of one-quarter wavelength uniformly over the wide visible-light region. Thus, the method of Patent Document 1 cannot provide the effect of sufficiently improving a visibility.

In addition, the method of Patent Document 2 requires the use of a highly birefringent material formed of a special material such as calcite or synthetic quartz. This complicates the structure of a liquid crystal display device, and therefore, this makes it difficult to employ a structure with a high degree of freedom for increasing the screen size or reducing the weight. Thus, this method has little practicality.

The present invention has been completed to solve the above problem, and it is an object of the present invention to provide a liquid crystal display device capable of, when the screen thereof is observed through a polarizer such as sunglasses, ensuring an excellent visibility to a high degree regardless of the angle of observation.

Means for Solving the Problems

The present inventors have intensively studied to attain the above object, and as a result, they have found that the combined use of a specific backlight light source and a polymer film having a specific retardation makes it possible to solve the above problems, thereby leading to the completion of the present invention.

That is, the present invention includes the following inventions set forth in (i) to (vi) below:

(i) A method for improving a visibility of a liquid crystal display device at least comprising a backlight light source, a liquid crystal cell, and a polarizer disposed on a viewing side of the liquid crystal cell, which method comprises:

using a white light-emitting diode as the backlight light source; and using a polymer film having a retardation of from 3,000 to 30,000 nm, which polymer film is disposed on the viewing side of the polarizer so that an angle between an absorption axis of the polarizer and a slow axis of the polymer film becomes about 45 degrees.

(ii) The method for improving a visibility of a liquid crystal display device as described above, wherein the white light-emitting diode is a light-emitting device comprising a combination of an yttrium-aluminum-garnet yellow phosphor with a blue light-emitting diode using a compound semiconductor.

(iii) The method for improving a visibility of a liquid crystal display device as described above, wherein the polymer film is an oriented polycarbonate film.

(iv) The method for improving a visibility of a liquid crystal display device as described above, wherein the polymer film is an oriented polyester film.

(v) A liquid crystal display device using the method for improving a visibility as described above.

(vi) A polymer film to be used in the method for improving a visibility as described above.

Effects of the Invention

The method of the present invention efficiently depolarizes linearly polarized light in a white light-emitting diode light source having a continuous and wide emission spectrum, and provides a spectrum approximated to that of the light source. This makes it possible that even when the screen of a liquid crystal display is observed through a polarizer such as sunglasses, an excellent visibility is ensured regardless of the angle of observation.

BEST MODE FOR CARRYING OUT THE INVENTION

In general, a liquid crystal panel comprises a back module, a liquid crystal cell, and a front module in order, starting from the side opposing a backlight source to the side on which an image is displayed (i.e., to the viewing side). The back module and the front module each ordinarily include a transparent substrate, a transparent conductive film formed on the surface of the transparent substrate on the liquid crystal cell side, and a polarizer disposed on the opposite side. In this regard, the polarizer in the back module is disposed on the side opposing the backlight source, and the polarizer in the front module is disposed on the side on which an image is displayed (i.e., on the viewing side).

The liquid crystal display device (LCD) of the present invention comprises, as components, at least a backlight source, a liquid crystal cell, and a polarizer disposed on the viewing side of the liquid crystal cell. As described above, it is ordinary that a liquid crystal cell is disposed between two polarizers, i.e., one on the backlight source side and the other on the viewing side. Therefore, another polarizer may also be disposed on the liquid crystal cell on the side opposite to the viewing side. Furthermore, the liquid crystal display device (LCD) may appropriately comprise other components, in addition to the above components, such as a color filter, a lens film, an optical diffusion sheet, and an antireflection film.

In the present invention, it is necessary to use white light-emitting diodes (white LEDs) as the backlight source of the liquid crystal display device (LCD). The white LEDs refer to phosphor-based devices, that is, devices that emit white light by the combined use of phosphors with light-emitting diodes using compound semiconductors to emit blue light or ultraviolet light. Among these devices, in particular, white light-emitting diodes comprising light-emitting devices obtained by the combined use of yttrium-aluminum-garnet yellow phosphors with blue light-emitting diodes using compound semiconductors are suitable as the backlight source of the present invention. This is because the white light-emitting diodes have a continuous and wide emission spectrum and also have an excellent luminous efficiency. Furthermore, the method of the present invention enables a wide range of the applications of white LEDs, which consume low power, and therefore, it can also attain the effect of energy conservation.

In this connection, a method including the combined use of red-emitting, green-emitting, and blue-emitting LEDs as a white light source has also been put to practical use. This method, however, is not preferred, because it provides a narrow and discontinuous emission spectrum, and therefore, it is expected to become difficult to obtain a desired effect of the present invention.

In addition, the present invention cannot use fluorescent tubes such as cold-cathode tubes or hot-cathode tubes either, which have hitherto been widely used as backlight sources. This is because the emission spectrum of each of these light sources is a discontinuous emission spectrum having peaks at specific wavelengths. Therefore, to produce white light by interference colors from such an emission spectrum, it is necessary to use a special inorganic material having a retardation of higher than 100,000 nm. This significantly restricts the design of liquid crystal display devices.

In the present invention, it is characterized that a polymer film having a specific range of retardation is disposed on the viewing side of the polarizer. The present inventors have obtained the idea of the present invention by focusing on the envelope curve shape of the interference color spectrum of the light transmitted through a birefringent material. That is, the present inventors have found that a visibility is significantly improved when the shape of the emission spectrum of a light source becomes similar to the envelope curve shape of the interference color spectrum of the light transmitted through a birefringent material, thereby leading to the completion of the present invention. More specifically, the effect of improving a visibility with the constituent features of the present invention is based on the following technical idea.

If a polymer film having birefringent properties is disposed between two mutually orthogonal polarizers, light is transmitted in such a manner that linearly polarized light emitted from the polarizers is disturbed when passing through the polymer film. The transmitted light shows an interference color specific to the retardation of the polymer film, which is the product of the birefringence and the thickness thereof. The present invention employs white LEDs having a continuous emission spectrum as the light source. This makes it possible to approximate the envelope curve shape of the spectrum of transmitted light, showing an interference color, to the emission spectrum of the light source by controlling the retardation in a specific range achievable also with a polymer film. The present invention has thus led to an improvement in visibility (see FIG. 3).

To attain the above effect, the polymer film used in the present invention needs to have a retardation of from 3,000 to 30,000 nm. If the retardation is lower than 3,000 nm, a strong interference color is presented when the screen is observed through a polarizer such as sunglasses. This makes the envelope curve shape dissimilar to the emission spectrum of the light source, and therefore, it is not possible to ensure an excellent visibility. The lower limit of the retardation may preferably be 4,500 nm, more preferably 6,000 nm, still more preferably 8,000 nm, and further still more preferably 10,000 nm.

On the other hand, the upper limit of the retardation is 30,000 nm. A polymer film having a retardation of higher than 30,000 nm is not preferred. This is because the use of such a polymer film cannot substantially attain the effect of further improving a visibility, but also leads to a considerable increase in the thickness of the film. This reduces the handling ability of the film as an industrial material.

In this connection, the retardation of the present invention can be determined by measuring refractive indices in two mutually orthogonal directions and thickness, or can also be determined using a commercially available automatic birefringence analyzer such as KOBRA-21ADH (Oji Scientific Instruments).

In the present invention, white LEDs having a wide emission spectrum are used as the light source. Therefore, the adjustment of the retardation of a polymer film to the above range makes it possible to approximate the envelope curve shape of the spectrum of transmitted light to the emission spectrum of the light source only with a relatively simple structure. That is, in the case of a conventional technique, the use of a light source having a discontinuous emission spectrum requires the use of a birefringent material having a very high retardation (e.g., higher than 100,000 nm) for an improvement in visibility. In contrast, the present invention can attain a unique effect of improving a visibility with a relatively simple structure as described above, making use of the property of a white LED light source having a continuous emission spectrum.

The polymer film used in the present invention is disposed on the viewing side of the polarizer, which is disposed on the viewing side of the liquid crystal cell, so that an angle between the absorption axis of the polarizer and the slow axis of the polymer film becomes about 45 degrees. The method of disposing the polymer film on the viewing side of the polarizer may be performed by layering the polymer film directly on the outermost layer of the polarizer, or may be performed by disposing the polymer film on the polarizer via another transparent member. Alternatively, the polymer film may be provided on and attached to the top surface of the liquid crystal display device on the viewing side. When the polymer film is disposed directly or via another transparent member, the polymer film may preferably have a pressure-sensitive adhesive layer.

When the polymer film is disposed, it is desirable that the angle between the absorption axis of the polarizer and the slow axis of the polymer film should become about 45 degrees. This makes it possible to obtain highly transmitted light, even if a polarizer such as sunglasses is at any angle. In this connection, the above angle does not need to be exactly 45 degrees, and may appropriately be adjusted, if necessary, in the range where the effect of the present invention is not impaired. The range of the angle may preferably be from 30 to 60 degrees, and more preferably from 40 to 50 degrees.

The material of the polymer film used in the present invention is not particularly limited, but may be any material. Examples of the material of the polymer film may include polyesters such as polyethylene terephthalate and polyethylene naphthalate, polycarbonates, polystyrenes, polyether ether ketones, polyphenylene sulfides, and cycloolefin polymers. Among these, examples of the particularly preferred material may include polycarbonates and polyesters. The resins of these materials have excellent transparencies and also have excellent thermal and mechanical properties. This makes it possible to easily control the retardations of the resins by stretching. In particular, polyesters typified by polyethylene terephthalate are the most suitable materials, because they have high intrinsic birefringences, and therefore, they can relatively easily provide a great retardation, even if the thickness of the film is small.

Next, the polymer film of the present invention has specific birefringent properties, and therefore, it is desirable that the polymer film should be an oriented film. The method of producing the oriented film, however, is not particularly limited, so long as the film properties defined in the present invention are satisfied.

In the case of a polycarbonate film, an oriented polycarbonate film having a specific retardation can be obtained by stretching a non-oriented sheet in one direction (or in two directions, if necessary) at a temperature equal to or higher than the glass transition temperature thereof, which non-oriented sheet is obtained by melting polycarbonate and extruding the melted polycarbonate into a sheet. Suitable examples of the non-oriented polycarbonate sheet may also include commercially available ones and those which are produced by solution film formation.

Alternatively, in the case of a polyester film, as an example, a method is performed, in which a non-oriented polyester is stretched in the transverse direction by a tenter at a temperature equal to or higher than the glass transition temperature thereof, which non-oriented polyester is obtained by melting a polyester and extruding the melted polyester into a sheet, followed by heat treatment.

More specifically, the temperature for stretching in the transverse direction may preferably be from 80° C. to 130° C., and particularly preferably from 90° C. to 120° C. Furthermore, the stretch ratio for stretching in the transverse direction may preferably be from 2.5 to 6.0, and particularly preferably from 3.0 to 5.5. If the stretch ratio is too high, the transparency of the film to be obtained is likely to decrease. On the other hand, it is not preferred that the stretch ratio should be too low. This is because the stretch tension also decreases, and therefore, the birefringence of the film to be obtained decreases, which reduces the retardation. In the subsequent heat treatment, the treatment temperature may preferably be from 100° C. to 250° C., and particularly preferably from 180° C. to 245° C.

It is possible to control the retardation of the polymer film in a specific range by appropriately setting the stretch ratio, the stretch temperature, and the thickness of the polymer film. For example, the higher the stretch ratio, or the lower the stretch temperature, or the greater the thickness of the film, the more likely a great retardation is obtained. In contrast, the lower the stretch ratio, or the higher the stretch temperature, or the smaller the thickness of the film, the more likely a small retardation is obtained.

The polymer film of the present invention may be subjected to surface treatments, i.e., corona discharge treatment (e.g., in air, nitrogen, or carbon dioxide gas) and adhesion facilitating treatment, by known methods, for the purpose of improving water resistance, chemical resistance, and adhesiveness between the film and a layer to be formed thereon, such as an adhesive layer, a release layer, and an antistatic layer. The adhesion facilitating treatment may be performed by various known methods. For example, a method may suitably be employed of applying one of various known adhesion facilitating agents to the film during the production process thereof, or to the film that has been uniaxially or biaxially stretched.

The polymer film used in the present invention may have any thickness, but may preferably have a thickness in the range of from 25 to 500 μm. Even a film having a thickness of lower than 25 μm can, in principle, provide a retardation of 3,000 nm or higher. In this case, however, the mechanical properties of the film become significantly anisotropic. This causes the film to, for example, tear or break, which significantly reduces the practicality of the film as an industrial material. The lower limit of the thickness may particularly preferably be 35 μm. On the other hand, the film having a thickness of higher than 500 μm is not preferred, because such a film is very rigid, which reduces flexibility inherent to a polymer film. This again reduces the practicality of the film as an industrial material. The upper limit of the film thickness may particularly preferably be 350 μm.

EXAMPLES

The present invention will hereinafter be described more specifically by way of Examples, but the present invention is not limited to the Examples described below. The present invention can be put into practice after appropriate modifications or variations within a range meeting the gist of the present invention, all of which are included in the technical scope of the present invention. In the following Examples, the methods for the evaluation of physical properties are as follows:

<Retardation>

A retardation is a parameter defined by the product ($\Delta N \times d$) of the anisotropy ($\Delta N = |Nx - Ny|$) of the refractive indices in two mutually orthogonal directions on a film and the film thickness d (nm), and is a scale indicating optical isotropy or anisotropy. The anisotropy ($\Delta N$) of refractive indices in two directions is obtained by the following method. The directions of orientation axes of a film were determined using two polarizers, and the film was cut into a rectangle of 4 cm×2 cm so that the directions of orientation axes are mutually orthogonal. The cut piece was used as a sample for measurement. The sample was measured for the refractive indices (Nx and Ny) in two mutually orthogonal directions and the refractive index (Nz) in the thickness direction by the use of an Abbe refractometer (NAR-4T available from ATAGO Co., Ltd.). Then, the absolute value (|Nx−Ny|) of the difference between the refractive indices in two directions was defined as the anisotropy ($\Delta N$) of the refractive indices. The film thickness d (nm) was measured using an electric micrometer (Millitron 1245D available from Feinpruf GmbH), and was converted to the unit of nm. The retardation (Re) was determined by the product ($\Delta N \times d$) of the anisotropy ($\Delta N$) of the refractive indices and the film thickness d (nm). In this connection, of the orientation axes, the axis indicating the greater refractive index is defined as a slow axis.

Experimental Example 1

The following shows an example in which a polycarbonate film was used as the polymer film.

A polymer solution was prepared by dissolving polycarbonate (available from Aldrich Chemical Co.) into methylene chloride four times by weight. The polymer solution was spread on a flat and smooth glass plate with a knife coater, and was left at room temperature, and the solvent was dried. Then, the polycarbonate sheet was peeled from the glass plate, and was dried at 90° C. in a low-pressure dryer for 24 hours. A sample was cut into a dumbbell shape from the polycarbonate sheet obtained. The cut sheet sample was heated to a temperature of about 160° C. and uniaxially stretched using a tensilon (available from Orientec Co., Ltd.). The stretch ratio and the stretch rate during the stretching were adjusted, thereby obtaining an oriented polycarbonate film having a desired retardation.

The interference color of the oriented polycarbonate film obtained was observed. As a light source, white light-emitting diodes (NSPW500CS available from Nichia Corporation) were used, which included light-emitting devices obtained by the combined use of yttrium-aluminum-garnet yellow phosphors with blue light-emitting diodes.

Figure 1:
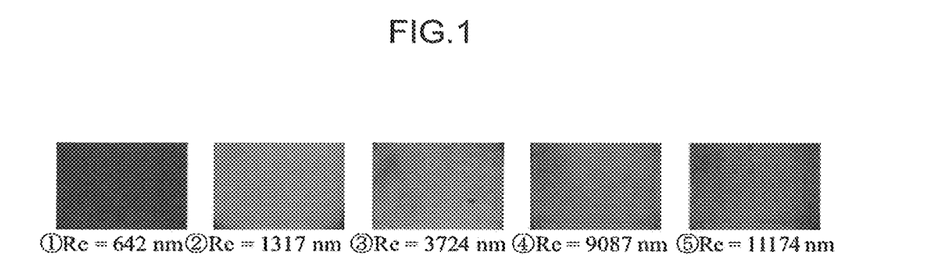
FIG. 1 shows the interference colors of a polycarbonate film, which were observed using a white LED light source.

FIG. 1 shows the relationship between the retardation and the interference color of the oriented polycarbonate film, which relationship was actually measured as described above.

Next, the interference color chart for the oriented polycarbonate film was prepared by simulation.

In the case where a birefringent material is disposed in a diagonal position between crossed nicols and a white light source is used as a backlight, if the light transmitted through the crossed nicols is defined as an interference color, the transmittance of the light is represented by the following formula (1):

$$I/I_0 = \tfrac{1}{2} \cdot \sin^2(\pi \cdot Re/\lambda) \tag{1}$$

where $I_0$ indicates the intensity of the light incident on the crossed nicols; I indicates the intensity of the light transmitted through the crossed nicols; and Re indicates the retardation of the birefringent material. The transmittance ($I/I_0$) thus changes depending on the retardation and the wavelength of the light, and therefore, an interference color specific to the value of the retardation is observed.

However, the refractive indices of a polymer material (particularly in the short-wavelength region of visible light) have great wavelength-dispersive properties. Such wavelength-dispersive properties may vary depending on the polymer material. If the birefringence has wavelength dependence, the birefringence changes depending on the wavelength. Thus, when the above formula (1) was applied to oriented polycarbonate, the following formula (2) was applied in the experimental example, taking into consideration wavelength-dispersive properties inherent to polycarbonate.

$$I/I_0 = \tfrac{1}{2} \cdot \sin^2(\pi \cdot f(\lambda) \cdot Re/\lambda) \tag{2}$$

where $f(\lambda)$ is a function representing the wavelength-dispersive properties of the birefringence.

Figure 2:
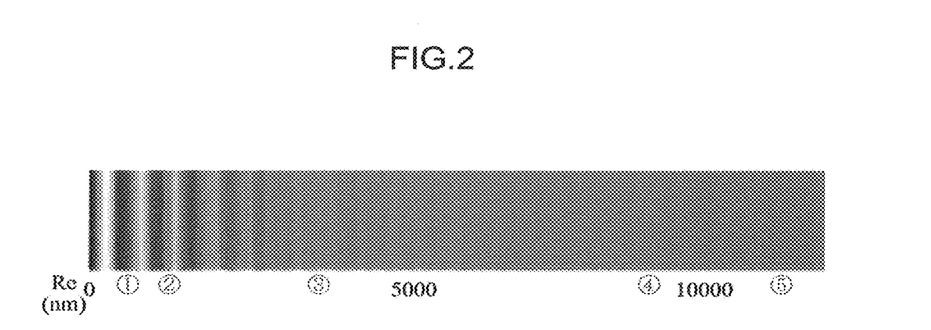
FIG. 2 shows the interference color chart for the polycarbonate film, which was calculated using the emission spectrum of the white LED light source.

Based on the above formula (2), a program was prepared for calculating an interference color, taking into consideration the wavelength-dispersive properties of the birefringence of the oriented polycarbonate film, and an interference color chart was prepared, which represented the relationship between the retardation and the interference color. FIG. 2 shows the interference color chart for the oriented polycarbonate film, which was calculated using the emission spectrum of the white light-emitting diodes as shown in FIG. 1. From FIGS. 1 and 2, colors coincided with each other between the actual measurements and the simulation. Thus, it was understood that a change in the interference color decreased significantly when retardation (Re)≥3,000 nm, and the interference color was almost constant when Re≥about 8,000 nm.

Figure 3:
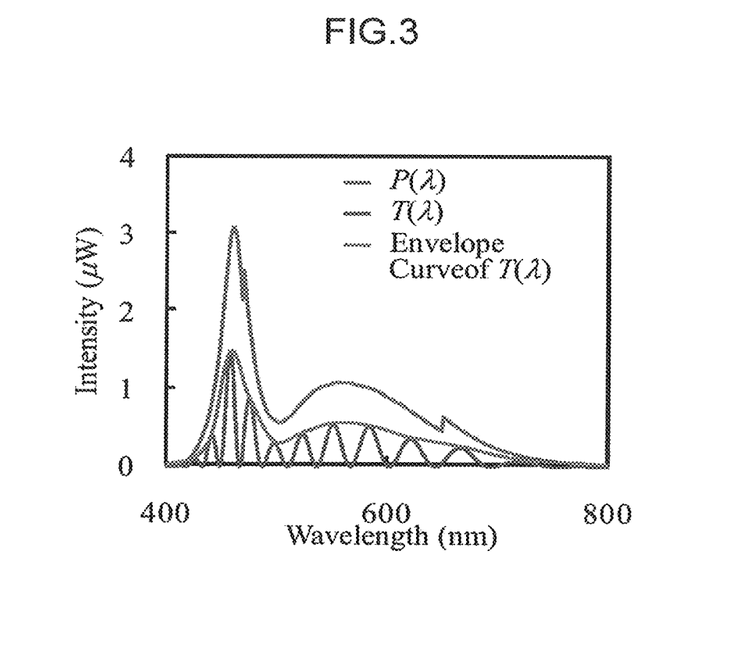
FIG. 3 shows the calculation results of the emission spectrum of the white LED light source, and the spectrum of the light transmitted through crossed nicols when Re=8,000 nm.

In addition, FIG. 3 shows the spectrum of the light transmitted through the crossed nicols when Re=8,000 nm. In FIG. 3, P(λ) is the emission spectrum of the light source (white LEDs), and T(λ) is the spectrum of the transmitted light. The envelope curve shape of the spectrum of the transmitted light was similar to, and preserved, the shape of the emission spectrum of the light source. Thus, it was revealed that the constant interference color of the oriented polycarbonate film was effectively formed from the emission spectrum of the light source. Furthermore, it was confirmed that the intensity of the transmitted light was a quarter of the intensity of the light source.

Figure 4:
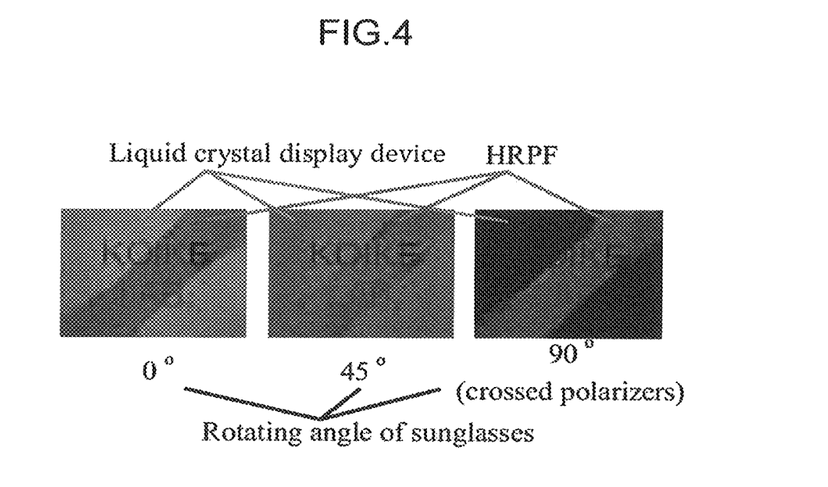
FIG. 4 shows the images obtained when the screen of a liquid crystal display obtained by the method of the present invention was observed through sunglasses.

FIG. 4 shows the state where the oriented polycarbonate film (Re=9,087 nm) obtained by the above method was placed on a liquid crystal display (having a structure in which a liquid crystal cell was sandwiched between two polarizers) that employed, as a backlight source, white LEDs (NSPW500CS available from Nichia Corporation) having light-emitting devices obtained by the combined use of yttrium-aluminum-garnet yellow phosphors with blue light-emitting diodes, and the screen of the liquid crystal display was viewed through polarized sunglasses. It was possible to view displayed colors as unchanged regardless of the angle between the liquid crystal display and the polarizer, i.e., the polarized sunglasses. Thus, it was confirmed that the produced film was able to be used as a device for improving the visibility of a liquid crystal display that employed white LEDs as a backlight source.

Figure 5:
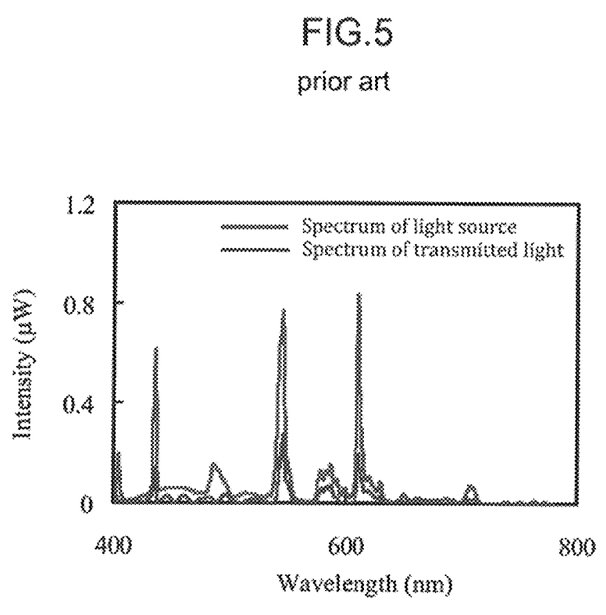
FIG. 5 shows the calculation results of the emission spectrum of cold-cathode tubes of the prior art, and the spectrum of the light transmitted through the crossed nicols when Re=8,000 nm.

In this connection, FIG. 5 shows the emission spectrum of ordinary, prior art cold-cathode tubes, and the spectrum of the light transmitted through the crossed nicols when Re=8,000 nm. In FIG. 5, P(λ) is the emission spectrum of the light source, and T(λ) is the spectrum of the transmitted light. The spectrum of the transmitted light did not preserve the shape of the emission spectrum of the light source. Thus, it was implied that the transmitted light presented a color different from that of the light source.

Figure 6:
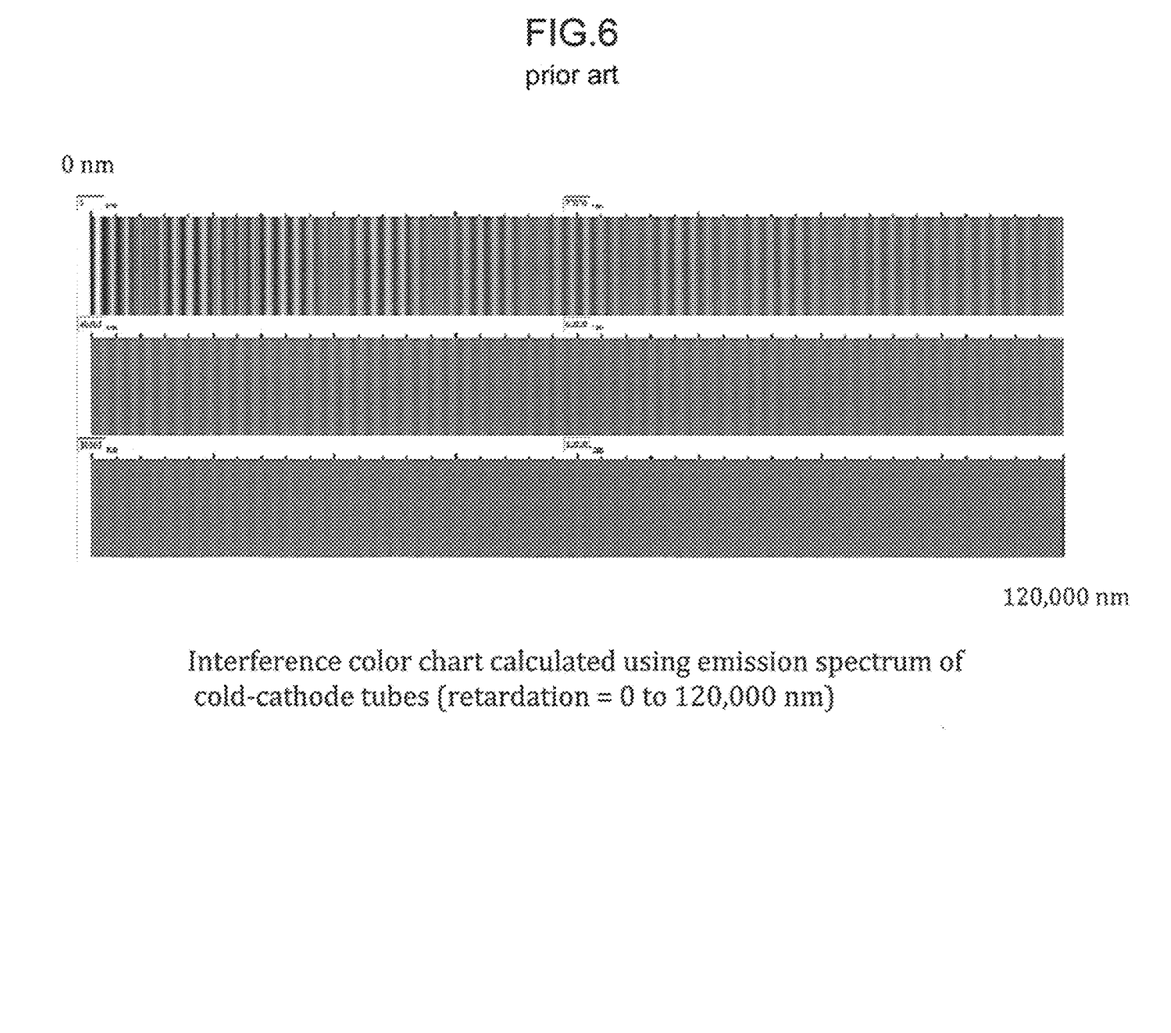
FIG. 6 shows the interference color chart for the polycarbonate film, which was calculated using the emission spectrum of the cold-cathode tubes of the prior art.

In addition, FIG. 6 shows the interference color chart for the oriented polycarbonate film, which was calculated using the emission spectrum of the prior art cold-cathode tubes as shown in FIG. 5. From comparison between FIGS. 5 and 2, it was understood that a change in the interference color relative to the retardation greatly varied depending on the spectrum of the light source, and therefore, the effect of improving a visibility according to the present invention was not able to be obtained when cold-cathode tubes were used as a backlight source.

Experimental Example 2

The following will show an example in which an oriented polyethylene terephthalate (PET) film was used as the polymer film.

First, 1,000 parts of dimethyl terephthalate, 700 parts of ethylene glycol, and 0.16 parts of manganese acetate tetrahydrate were put in a transesterification reaction vessel, transesterification reaction was performed at a temperature of from 120° C. to 210° C., and the generated methanol was distilled off. When the transesterification reaction was completed, 0.13 parts of antimony trioxide and 0.017 parts of orthophosphoric acid were added, and the pressure in the system was gradually reduced to 133 Pa for 75 minutes. Simultaneously, the temperature was gradually increased to 280° C. Under these conditions, polycondensation reaction was performed for 70 minutes, and the melted polymer was extruded into water through a discharge nozzle, thereby obtaining a PET resin having an intrinsic viscosity of 0.62 dl/g.

An unstretched film was produced by extruding the PET resin having an intrinsic viscosity of 0.62 dl/g onto a water-cooled rotary quenching drum through a film-forming die. The unstretched film was stretched 4.0 times in the transverse direction at 100° C., and then thermally fixed at 150° C., and further relaxed by 3% in the width direction while being cooled from 130° C. to 100° C., thereby obtaining an oriented PET film having a thickness of 38 μm (PET film 1).

In addition, an oriented PET film having a thickness of 200 μm (PET film 2) was obtained using a method similar to that of PET film 1 and changing the thickness of the unstretched film.

An unstretched film produced using a method similar to that of PET film 1 was heated to 105° C. using heated rolls and an infrared heater, and then stretched 3.4 times in the machine direction (i.e., in the running direction) by rolls different from each other in peripheral speed, thereby obtaining an oriented PET film having a thickness of 700 μm (PET film 3).

Table 1 shows the properties of the oriented PET films obtained by the above methods. Furthermore, Table 2 shows the state where each of the films was placed on a liquid crystal display device (having the structure where a liquid crystal cell was sandwiched between two polarizers) that employed, as a light source, white LEDs (NSPW500CS available from Nichia Corporation) having light-emitting devices obtained by the combined use of yttrium-aluminum-garnet yellow phosphors with blue light-emitting diodes, and each of the films was also placed on a liquid crystal display device (having the structure where a liquid crystal cell was sandwiched between two polarizers) that employed cold-cathode tubes as a backlight source, and the screen of each liquid crystal display device was viewed through sunglasses.

From the above results, it was understood that each of the produced films was able to provide the effect of improving a visibility when white LEDs were used as the backlight source, but was not able to provide the effect of improving a visibility when cold-cathode tubes were used as the backlight source.

TABLE 1

|  | Thickness (μm) | Nx | Ny | Nz | Δn | Retardation (nm) |
| --- | --- | --- | --- | --- | --- | --- |
| PET film 1 | 38 | 1.5874 | 1.6854 | 1.5209 | 0.0980 | 3,724 |
| PET film 2 | 200 | 1.5902 | 1.6978 | 1.5147 | 0.1076 | 21,520 |
| PET film 3 | 700 | 1.6463 | 1.5831 | 1.5574 | 0.0630 | 44,100 |

TABLE 2

| | Thickness (μm) | Retardation (nm) | Visibility of liquid crystal display devices | |
|---|---|---|---|---|
| | | | LCD using white LEDs as light source | LCD using cold-cathode tubes as light source |
| PET film 1 | 38 | 3,724 | Interference color was slightly seen depending on direction of sunglasses, but display screen was uniform and visibility having no problems for practical use was obtained. | Different interference colors were seen depending on direction of sunglasses. Irregularities of color and brightness derived from irregularities of retardation of film were also observed in display screen. |
| PET film 1 (used as two-ply film) | 76 | 7,448 | Visibility was excellent. | Different interference colors were seen depending on direction of sunglasses. Irregularities of color and brightness in screen were slightly decreased, probably because irregularities were compensated by two films. |
| PET film 2 | 200 | 21,520 | Visibility was very excellent. | Gentle Moire fringes derived from irregularities of retardation of film were observed in screen. Shading of Moire fringes was changed by direction of sunglasses. |
| PET film 3 | 700 | 44,100 | Visibility was very excellent, but film was rigid and handling ability was poor. | Many wood-grain Moire fringes derived from irregularities of retardation of film were observed in screen, and visibility was very poor. |

INDUSTRIAL APPLICABILITY

The method for improving the visibility of a liquid crystal display according to the present invention can preferably be applied to liquid crystal display devices used outdoors, for example, instrument panels of automobiles, ships, and airplanes; mobile devices such as automobile-mounted navigation systems, digital cameras, mobile phones, and personal computers; and digital signages used in buildings, supermarkets, and other facilities.

The invention claimed is:

1. A method of preparing a liquid crystal display device comprising
    (a) providing a backlight light source, a liquid crystal cell, a polarizer, and an oriented polyethylene terephthalate film,
    (b) disposing the polarizer on a viewing side of the liquid crystal cell, and
    (c) disposing the oriented polyethylene terephthalate film on a viewing side of the polarizer,
    wherein
    the backlight light source is a white light source having a continuous emission spectrum,
    the oriented polyethylene terephthalate film has a retardation of 3,000 nm or more and less than 10,000 nm,
    the range of the angle between the absorption axis of the polarizer and the slow axis of the oriented polyethylene terephthalate film is from 30 to 60 degrees, and
    the oriented polyethylene terephthalate film has a property that, when the light from the backlight light source enters into crossed nicols wherein the oriented polyethylene terephthalate film is disposed in a diagonal position between the crossed nicols, the envelope curve shape of the spectrum of the transmitted light through the crossed nicols and the oriented polyethylene terephthalate film is similar to, and preserves, the shape of the emission spectrum of the backlight light source.

2. The method according to claim 1, wherein the white light source is a light-emitting device comprising a combination of an yttrium-aluminum-garnet yellow phosphor with a blue light-emitting diode using a compound semiconductor.

3. The method according to claim 1, wherein the oriented polyethylene terephthalate film is an uniaxially-stretched polyethylene terephthalate film.

4. A liquid crystal display device comprising
    (a) a backlight light source,
    (b) a liquid crystal cell,
    (c) a polarizer disposed on a viewing side of the liquid crystal cell, and
    (d) an oriented polyethylene terephthalate film disposed on a viewing side of the polarizer,
    wherein
    the backlight light source is a white light source having a continuous emission spectrum,
    the oriented polyethylene terephthalate film has a retardation of 3,000 nm or more and less than 10,000 nm,
    the range of the angle between the absorption axis of the polarizer and the slow axis of the oriented polyethylene terephthalate film is from 30 to 60 degrees, and
    the oriented polyethylene terephthalate film has a property that, when the light from the backlight light source enters into crossed nicols wherein the oriented polyethylene terephthalate film is disposed in a diagonal position between the crossed nicols, the envelope curve shape of the spectrum of the transmitted light through the crossed nicols and the oriented polyethylene terephthalate film is similar to, and preserves, the shape of the emission spectrum of the backlight light source.

* * * * *

UNITED STATES PATENT AND TRADEMARK OFFICE
CERTIFICATE OF CORRECTION

PATENT NO. : 10,054,816 B2
APPLICATION NO. : 13/509211
DATED : August 21, 2018
INVENTOR(S) : Yasuhiro Koike et al.

Page 1 of 1

It is certified that error appears in the above-identified patent and that said Letters Patent is hereby corrected as shown below:

Under item (56), References Cited:

Foreign Patent Documents, at page 4, left column, Line 52 (i.e., 24 lines from the bottom), "JP 201142380 A 12/2011" should read "TW 201142380 A 12/2011"

Foreign Patent Documents, at page 4, right column, Line 72 (i.e., 3 lines from the bottom), "Japanese Patent Application No. 201 1-1 60712" should read "Japanese Patent Application No. 2011-160702"

Other Publications, at page 5, left column, Line 60 (i.e., 11 lines from the bottom), "vol. 60, No. Mar. 2007 (Sep. 2007)" should read "Vol. 60. No. 3/2007 (Sep. 2007)"

Signed and Sealed this
Thirtieth Day of April, 2019

Andrei Iancu
*Director of the United States Patent and Trademark Office*